United States Patent
Katou et al.

[11] Patent Number: 5,896,805
[45] Date of Patent: Apr. 27, 1999

[54] COFFEE EXTRACTING APPARATUS AND METHOD IN WHICH COFFEE GROUNDS ARE EXPELLED FROM AN EXTRACTING CONTAINER BY PRESSED AIR

[75] Inventors: Isao Katou, Ota; Karin Okamura, Isesaki; Makoto Kobayashi, Takasaki; Akio Kawabata, Isesaki, all of Japan

[73] Assignee: Sanden Corporation, Japan

[21] Appl. No.: 08/872,140

[22] Filed: Jun. 10, 1997

[30] Foreign Application Priority Data

Jun. 11, 1996 [JP] Japan ................... 8-148859

[51] Int. Cl.⁶ ............... A47J 31/32; A47J 31/40
[52] U.S. Cl. .............. 99/289 R; 99/287; 99/302 P; 426/433
[58] Field of Search ............... 99/287, 289 R, 99/289 T, 302 P; 426/433

[56] References Cited

U.S. PATENT DOCUMENTS

| | | | |
|---|---|---|---|
| 2,935,011 | 5/1960 | Perlman | 99/302 P |
| 3,019,719 | 2/1962 | Parraga | 99/302 P |
| 4,534,985 | 8/1985 | Gasau | 99/289 R X |
| 4,967,647 | 11/1990 | King | 99/280 |
| 5,312,637 | 5/1994 | Midden | 99/302 P X |

FOREIGN PATENT DOCUMENTS

| | | |
|---|---|---|
| 0404604 | 12/1990 | European Pat. Off. . |
| 0627187 | 12/1994 | European Pat. Off. . |

*Primary Examiner*—Reginald L. Alexander
*Attorney, Agent, or Firm*—Banner & Witcoff, Ltd.

[57] ABSTRACT

In a coffee extracting apparatus in which coffee essence is extracted from coffee powder (200) in a container (51), an air feeding arrangement (43) is provided for feeding pressed air into the container. After the coffee essence is extracted from coffee powder, coffee grounds (200') are remained in the container. It is assumed that the coffee grounds are adhered to an inner surface of the container. In order to expel the coffee grounds from the container, the air feeding arrangement is controlled so that the pressed air is fed into the container after extracting the coffee essence from the coffee powder.

5 Claims, 3 Drawing Sheets

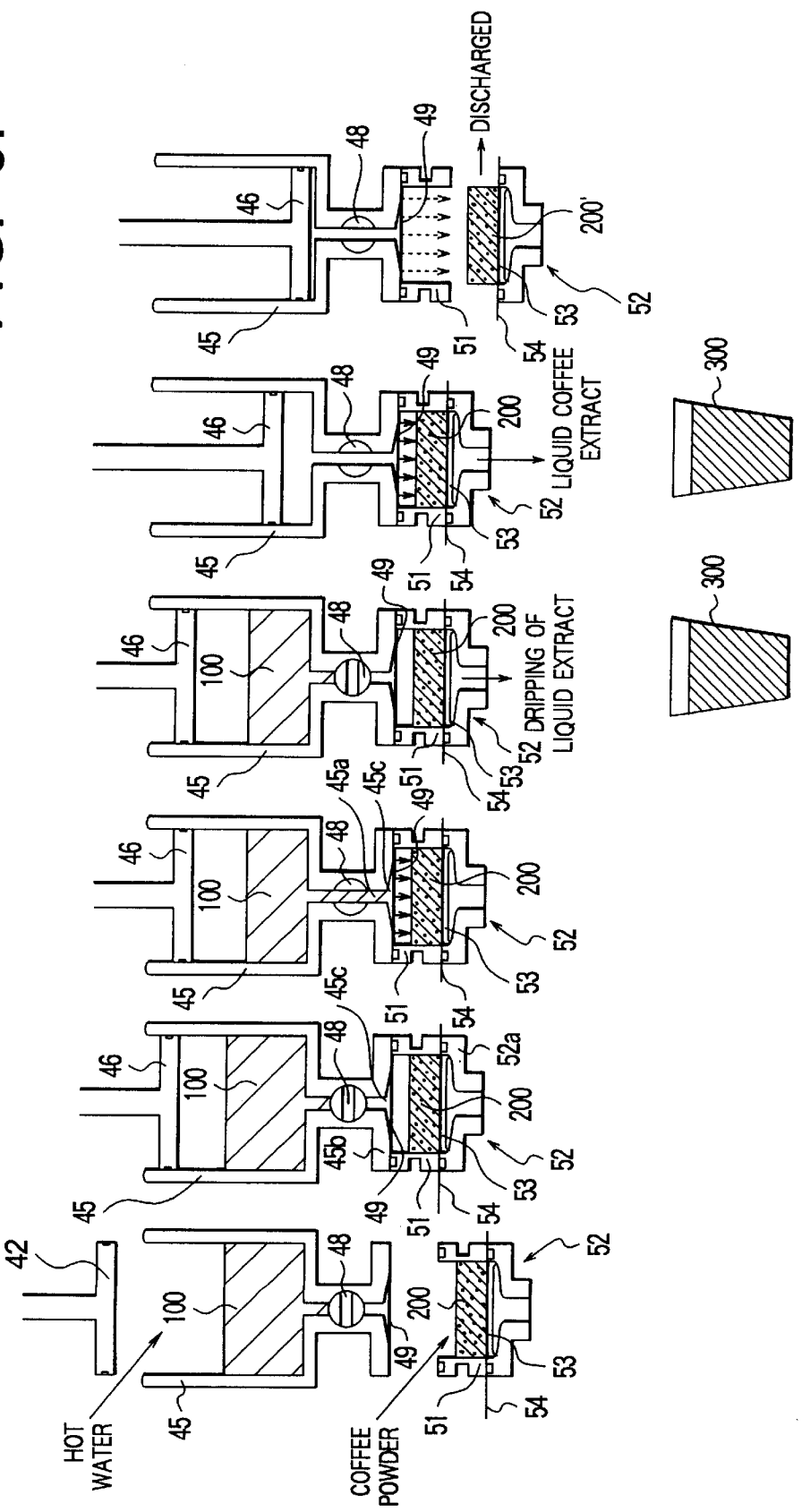

COFFEE EXTRACTING APPARATUS AND METHOD IN WHICH COFFEE GROUNDS ARE EXPELLED FROM AN EXTRACTING CONTAINER BY PRESSED AIR

BACKGROUND OF THE INVENTION

This invention relates to a coffee extracting apparatus and a method for extracting coffee essence from coffee material or powder.

An apparatus for extracting coffee essence from coffee powder by means of percolation has been in popular use to date. Such a percolating type coffee extracting apparatus comprises an extracting container for receiving coffee powder herein and a hot water feeding device for feeding hot water into the container. When the hot water is fed into the container, the coffee essence is extracted from the coffee powder in the container in the manner known in the art. A mixture of the coffee essence and the hot water is discharged as a liquid coffee extract from the container. After the liquid coffee extract is discharged from the container, coffee grounds are remained in the container. In order to expel the coffee grounds, the container is exposed to a shock or is shaken in a conventional percolating type coffee extracting apparatus.

However, the conventional percolating type coffee extracting apparatus has such problems as emitting noise when the container is caused to expel the coffee grounds by being exposed to the shock or being shaken. In addition, it is assumed that the coffee grounds are remained adhering to an inner surface of the container even after the container is exposed to the shock or is shaken.

SUMMARY OF THE INVENTION

It is therefore an object of this invention to provide a coffee extracting apparatus and method in which coffee grounds can be surely removed from an extracting container without emitting a noise.

It is another object of this invention to provide a coffee extracting apparatus and method in which the coffee grounds are expelled from an extracting container by pressed air.

Other objects of this invention will become clear as the description proceeds.

According to an aspect of this invention, there is provided a coffee extracting apparatus comprising a container for receiving coffee powder therein and extraction carrying out means for carrying out extraction of coffee essence from the coffee powder in the container. The coffee extracting apparatus further comprises air feeding means connected to the container for feeding pressed air into the container and air control means connected to the air feeding means and operatively connected to the extraction carrying out means for controlling the air feeding means to be actuated after carrying out the extraction.

According to another aspect of this invention, there is provided a coffee extracting apparatus comprising a cylindrical container having an outlet opening for receiving coffee powder therein, the coffee powder being extracted with coffee essence in the cylindrical container, a support member for supporting a filter member to cover the outlet opening of the cylindrical container, air feeding means connected to the cylindrical container for feeding pressed air into the cylindrical container, and air control means connected to the air feeding means for actuating the air feeding means after the coffee essence is discharged from the cylindrical container through the filter member.

According to this invention, there is provided a method of extracting coffee essence from coffee powder by means of percolation. The method comprises the steps of supplying coffee powder into a cylindrical container, feeding hot water to the coffee powder in the cylindrical container to produce liquid coffee extract and coffee grounds, discharging the liquid coffee extract from the cylindrical container, and feeding pressed air into the cylindrical container after the discharging step to expel the coffee grounds from the cylindrical container.

BRIEF DESCRIPTION OF THE DRAWING

FIGS. 3A through 3F are schematic diagrams for describing the operation of the percolating type coffee extracting apparatus illustrated in FIG. 2.

DESCRIPTION OF THE PREFERRED EMBODIMENT

Figure 1:
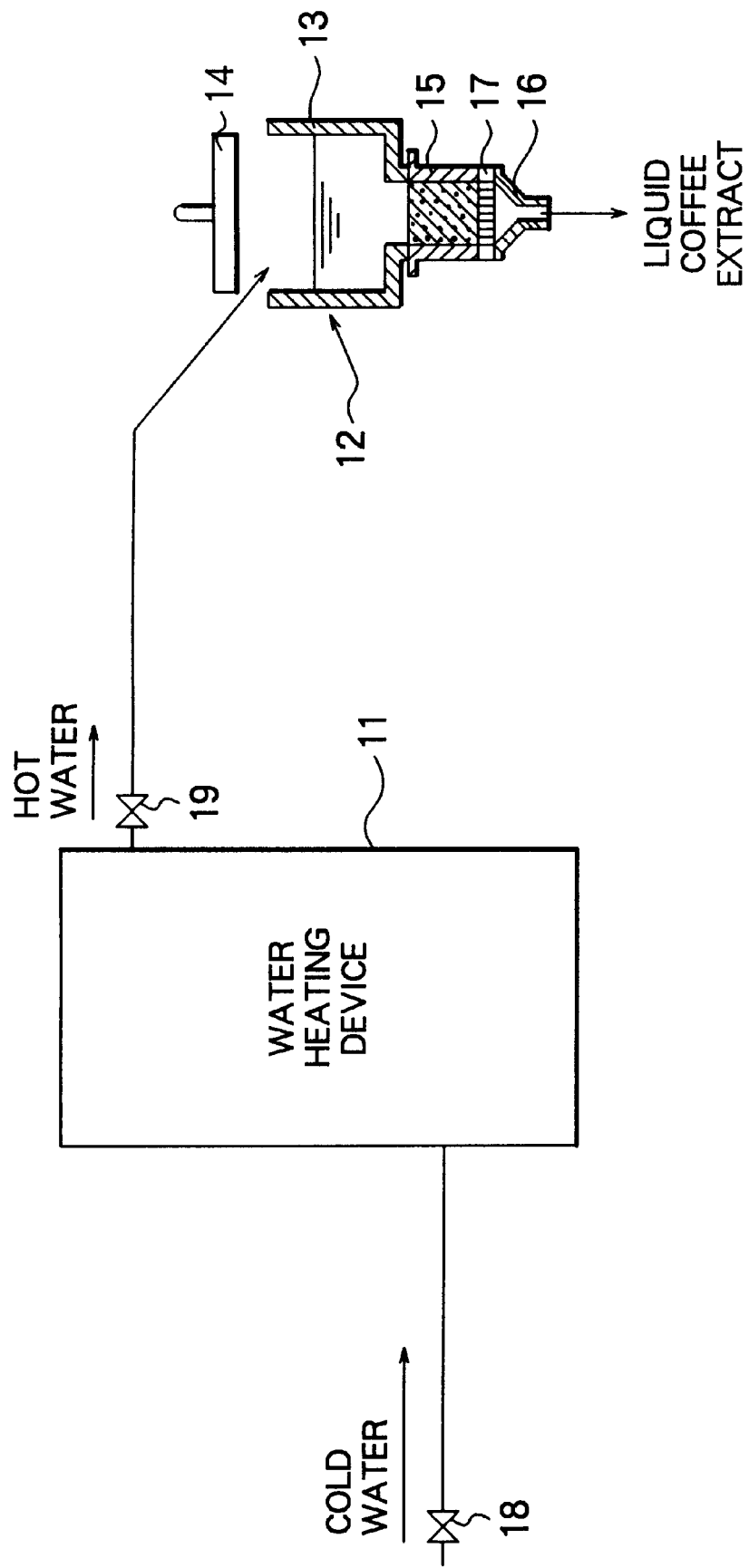
FIG. 1 is a schematic diagram of a conventional percolating type coffee extracting apparatus.

Referring to FIG. 1, description will be made as regards a conventional hot water feeding cylinder type extracting apparatus. The hot water feeding cylinder type extracting apparatus comprises a water heating device 11, a hot water feeding device 12 provided with a hot water cylinder 13 and a hot water piston 14 fitted into the hot water cylinder 13 and connected to the water heating device 11, an extracting cylinder 15 connected at one end thereof to the outlet of the hot water cylinder 13, and a filter support 16 for supporting a plate-like filter 17 so as to cover the other end of the extracting cylinder 15.

In the hot water feeding cylinder type extracting apparatus, cold water flows into the water heating device 11 via a valve 18. The cold water is heated by the water heating device 11 and turned into hot water of substantially normal pressure and elevated temperature. The hot water flows into the hot water cylinder 13 via a valve 19. By the operation of the hot water piston 14, the hot water of elevated temperature held in the hot water cylinder 13 is forced out via the outlet thereof. The hot water of substantially normal pressure and elevated temperature which has been forced out of the hot water cylinder 13 passes a layer of coffee powder in the extracting cylinder 15 and allows extraction of the coffee essence contained in the coffee powder. The liquid coffee extract is removed from the extracting cylinder 15 via the plate-like filter 17 and the filter support 16.

After the extraction of coffee essence, the plate-like filter 17 and the filter support 16 separate from the extracting cylinder 15 and then the extracting cylinder 15 separates from the hot water cylinder 13.

The extracting cylinder 15, when exposed to a shock or shaken, releases the coffee grounds remaining therein. The extraction of the coffee essence of the next round is started after the plate-like filter 17 and the filter support 16 have been joined to the extracting cylinder 15, the extracting cylinder 15 have been filled with the coffee powder, and the plate-like filter 17, the filter support 16, and the extracting cylinder 15 have been joined together to the hot water cylinder 13.

Next referring to FIG. 2, the description will be made as regards a coffee extracting apparatus according to an embodiment of this invention. The coffee extracting apparatus is of a percolating type known in the art.

A water heating device 41 is connected via a valve 42 to a water supply which is for conducting cold water. The water heating device 41 is for heating the cold water into hot water. A pressure hot water feeding device 43 is connected via a valve 44 to the water heating device 41.

The pressure hot water feeding device 43 is disposed on the downstream side of the water heating device 41. The pressure hot water feeding device 43 is provided with a hot water feeding cylinder 45, a hot water feeding piston 46 fitted into the hot water feeding cylinder 45, and a piston drive unit 47 for driving the hot water feeding piston 46.

One end of the hot water feeding cylinder 45 is diametrically converged to form an upstream area 45a of the outlet. An extracting cylinder cap 45b resembling a flange is formed in the end portion of the diametrically converged part. A downstream area 45c of the outlet is diametrically diverged in the shape of a funnel inside the extracting cylinder cap 45b. A water control valve 48 is for opening and closing the upstream area 45a of the outlet and is disposed in the hot water feeding cylinder 45. A flow distributor 49 resembling a shower nozzle is disposed inside the downstream area 45c of the outlet which is diametrically diverged in the shape of a funnel.

An extracting cylinder or container 51 is disposed contiguously to the extracting cylinder cap 45b in such a manner that one end thereof may be opposed to the extracting cylinder cap 45b.

A support member 52 is provided with a large-diameter tubular part 52a equal in diameter to the extracting cylinder 51 and a small-diameter tubular part 52b. The support member 52 is disposed contiguously to the extracting cylinder 51 in such a manner that the large-diameter tubular part 52a may be opposed to the other end of the extracting cylinder 51.

A plate-like filter 53 is fitted in the large-diameter tubular part 52a of the support member 52 and supported in place by the support member 52. The large-diameter tubular part 52a of the support member 52 contacts the other end of the extracting cylinder 51 across a paper filter 54. The paper filter 54 is supported jointly by the plate-like filter 53 and the large-diameter tubular part 52a of the support member 52. Therefore, a combination of the plate-like filter 53 and the paper filter 54 covers an outlet opening of the extracting cylinder 51 and will be referred to as a filter member.

A control device adapted to control the operations of the valves 42 and 44, the water heating device 41, the drive unit 47, the control valve 48, etc. and not shown in the diagram is disposed.

Figure 2:
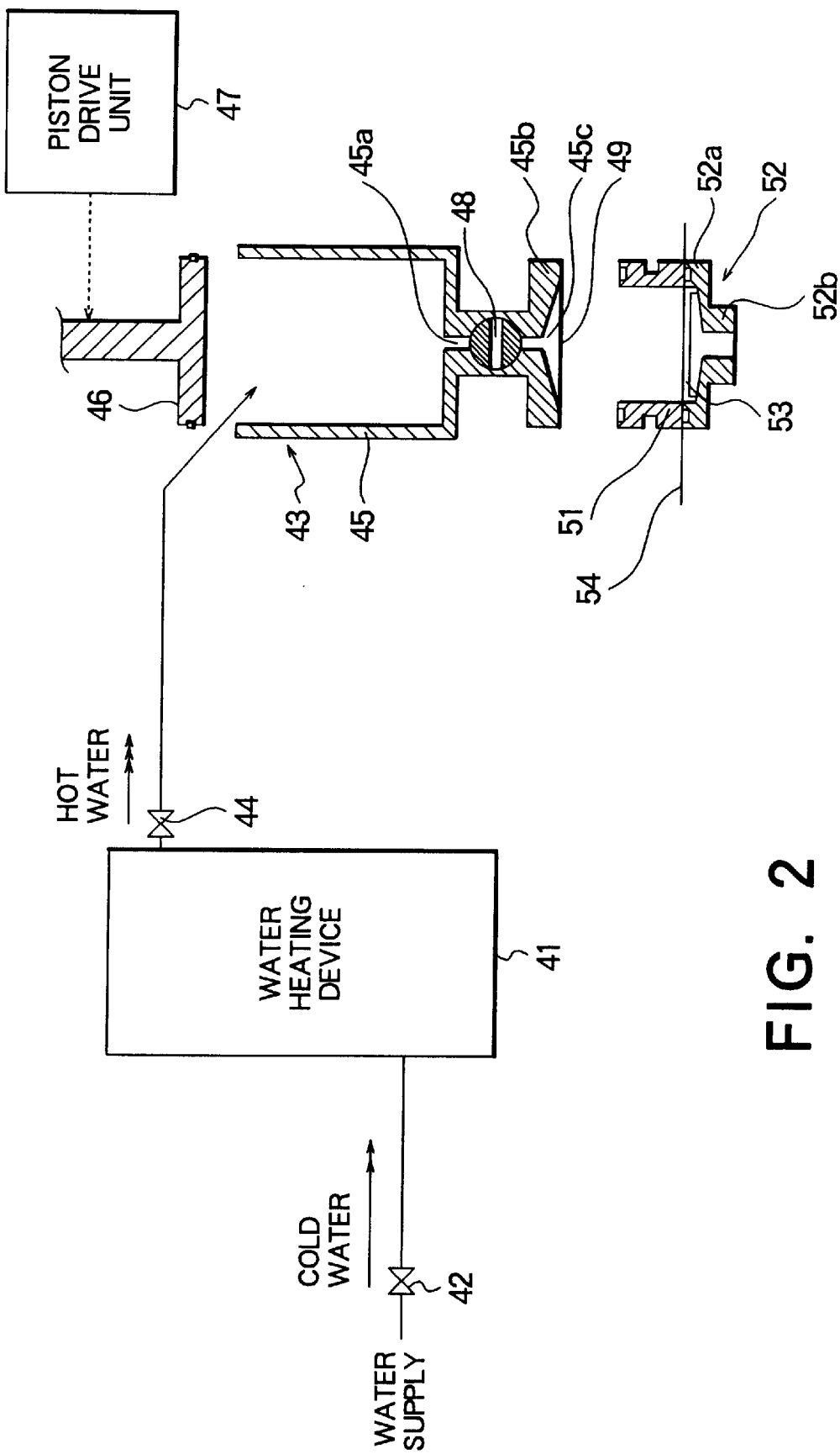
FIG. 2 is a schematic diagram of a percolating type coffee extracting apparatus according to an embodiment of this invention.

Referring to FIGS. 3A through 3F together with FIG. 2, the description is directed to operation of the coffee extracting apparatus.

While the coffee extracting apparatus is in the initial state thereof, the hot water feeding piston 46 assumes a retracted position separated from the hot water feeding cylinder 45 and the control valve 48 is closed as illustrated in FIG. 2. The large-diameter tubular part 52a of the filter support 52 contacts the other end of the extracting cylinder 51 across the paper filter 54. The extracting cylinder 51 keeps a distance from the extracting cylinder cap 45b.

Cold water of substantially normal pressure is supplied from the water supply via the valve 42 to the water heating device 41 as indicated by a double arrow in FIG. 2. The water heating device 41 heats the cold water of substantially normal pressure to form hot water of substantially normal pressure and elevated temperature of about 95° C.

As the valve 44 is kept open for a prescribed duration, the hot water of substantially normal pressure formed in the water heating device 41 flows in a prescribed volume into the hot water feeding cylinder 45 on the downstream side as indicated by a triple arrow in FIG. 2.

Hot water collects in a prescribed amount in the hot water feeding cylinder 45 as illustrated in FIG. 3A. A coffee powder 200 is fed into the extracting cylinder 51 from a supply device (not shown) in the manner known in the art.

As the drive unit 47 is actuated, the hot water feeding piston 46 advances into the hot water feeding cylinder 45 as illustrated in FIG. 3B, compresses the air in the hot water feeding cylinder 45, and presses the hot water 100 in the hot water feeding cylinder 45 to a level in the range of 1–3 kg/cm$^2$·G. As the extracting cylinder 51 and the support member 52 are integrated and are actuated by another drive unit not shown in the diagram, one end of the extracting cylinder 51 is pressed against the extracting cylinder cap 45b and connected to the downstream area 45c of the outlet of the hot water feeding cylinder 45. The contacting parts of the hot water feeding piston 46 and the hot water feeding cylinder 45, the pressed parts of the large-diameter tubular part 52a of the filter support 52 and the other end of the extracting cylinder 51, and the pressed parts of the one end of the extracting cylinder 51 and the extracting cylinder cap 45b are sealed with an O ring.

As illustrated in FIG. 3C, the control valve 48 is briefly opened during a first time duration. A particular or small amount of the hot water 100 pressed to a level in the range of 1–3 kg/cm$^2$·G is forced out of the hot water feeding cylinder 45 by the hot water feeding piston 46, passed through the upstream area 45a of the outlet until the funnel-shaped downstream area 45c of the outlet, spread over the entire surface of the flow distributor 49, passed through the flow distributor 49, fed in the form of a multiplicity of linear columns of flow like those of a shower to the extracting cylinder 51, and enabled to prewet the coffee powder 200 in the extracting cylinder 51.

As illustrated in FIG. 3D, the control valve 48 is briefly closed during a second time duration to restrict the feed of the hot water to the extracting cylinder 51. In this condition, the prewetted coffee powder 200 is steamed. A minute amount of the liquid extract obtained during the step of prewetting and the step of steaming is passed through the paper filter 54, the plate-like filter 53, and the support member 52 and dropped into a coffee cup 300.

The steps of prewetting and steaming result in heightening the concentration of the liquid coffee extract.

As illustrated in FIG. 3E, the control valve 48 is opened during a third time duration longer than the first time duration. The whole remaining hot water 100 pressed to a level in the range of 1–3 kg/cm$^2$·G is forced out of the hot water feeding cylinder 45 by the hot water feeding piston 46, passed through the upstream area 45a of the outlet until the downstream area 45c of the funnel-shaped outlet, passed through the flow distributor 49 resembling a shower nozzle as spread over the entire surface of the flow distributor 49, and fed as a specific amount of the hot water in the form of a multiplicity of linear columns of flow like those of a shower to the extracting cylinder 51. The hot water 100 pressed to a level in the range of 1–3 kg/cm$^2$·G passes the layer of the prewetted and steamed coffee powder 200 and extracts the coffee essence contained in the coffee powder. The liquid coffee extract passes the paper filter 54 and the plate-like filter 53 and flows through the filter support 52 and trickles down the coffee extracting apparatus into the coffee cup 300.

Since the coffee is extracted in a pressed state, the liquid coffee extract is obtained in a short period of time. Since the coffee essence is extracted by passing the hot water through the coffee powder 200, the liquid coffee extract is obtained in a high concentration.

Thus, the coffee extracting apparatus carries out an extracting process. During the extracting process, it is to be noted that the control valve 48 is driven to intermittently adjust the feed of the hot water to the extracting cylinder 51. On carrying out the extracting process, the pressure hot water feeding device 43 is referred to as an extraction carrying out arrangement.

The air of pressure increased to a level in the range of 1–3 kg/cm$^2$·G remaining in the hot water feeding cylinder 45 after the forced departure of the hot water 100 is forced out of the hot water feeding cylinder 45 by the hot water feeding piston 46 as illustrated in FIG. 3F and, at the same time, the paper filter 54 and the support member 52 enveloping the plate-like filter 53 are separated from the extracting cylinder 51 by the action of the other drive unit not shown in the diagram. The coffee grounds 200' in the extracting cylinder 51 are expelled from or forced out of the extracting cylinder 51 and dropped onto the paper filter 54 by the air pressed to a level in the range of 1–3 kg/cm$^2$·G. In this event, the hot water feeding device 43 is referred to as an air feeding arrangement and an air control arrangement.

In the coffee extraction by means of percolation, the coffee grounds 200' form a mass of relatively high density because the coffee powder does not assume a fluidized state during the course of extraction. The coffee grounds in the form of a mass is uniformly pushed by the pressed air and pushed out of the extracting cylinder 51 while retaining the form of a mass. After the removal of the coffee grounds 200', therefore, the possibility of the remnant of the coffee grounds adhering to the inner wall of the extracting cylinder is nil.

By a drive device not shown in the diagram, the used paper filter 54 carrying the coffee grounds 200' thereon is set moving laterally and discarded. At the same time, a newly supplied paper filter 54 is moved and set in place on the support member 52 by the drive device not shown in the diagram.

As the extracting cylinder 51 is actuated by the drive device not shown in the diagram, it separates from the extracting cylinder cap 45b and collides against the support member 52 which carries the unused paper filter 54 thereon.

It is clear from the description given above that the coffee extracting apparatus emits no noise during the removal of the coffee grounds 200' after the extraction of coffee because the coffee grounds 200' in the extracting cylinder 51 are removed from the extracting cylinder 51 by feeding the pressed air to the extracting cylinder 51. Further, since the coffee grounds 200' are uniformly pushed by the pressed air and forced out of the extracting cylinder 51 while retaining their shape as a mass, no remnant of the coffee grounds remains adhering to the inner wall of the extracting cylinder 51 after the removal of the coffee grounds 200'.

While the present invention has thus far been described in connection with a single embodiment thereof, it will readily be possible for those skilled in the art to put this invention into practice in various other manners.

For example, instead of driving the hot water feeding piston 46 thereby pressing the hot water in the hot water feeding cylinder 45 and, after the extraction of coffee, air control means can command air feeding means such as an apparatus for feeding the pressed air remaining in the hot water feeding cylinder 45 to the extracting cylinder 51, the compressed air produced in a compressor or the compressed air stored in a cylinder may be blown into the hot water feeding cylinder 45 to press the hot water in the hot water feeding cylinder 45 and, after the extraction of coffee, the pressed air in the hot water feeding cylinder 45 may be fed to the extracting cylinder 51 to remove the coffee grounds 200' in the extracting cylinder 51 from the extracting cylinder 51.

For example, instead of driving the hot water feeding piston 46 thereby pressing the hot water in the hot, water feeding cylinder 45 and, after the extraction of coffee, air control means can command air feeding means such as an apparatus for feeding the pressed air remaining in the hot water feeding cylinder 45 to the extracting cylinder 51, the compressed air produced in a compressor or the compressed air stored in a cylinder may be blown into the hot water feeding cylinder 45 to press the hot water in the hot water feeding cylinder 45 and, after the extraction of coffee, the pressed air in the hot water feeding cylinder 45 may be fed to the extracting cylinder 51 to remove the coffee grounds 200' in the extracting cylinder 51 from the extracting cylinder 51.

After the extraction of coffee and after the plate-like filter 53 and the support member 52 have been separated from the extracting cylinder 51, the air remaining in the hot water feeding cylinder 45 may be pressed by moving the hot water feeding piston 46 at a high speed and the resultant pressed air is fed to the extracting cylinder 51 to remove the coffee grounds from the extracting cylinder 51.

What is claimed is:

1. A coffee extracting apparatus comprising a container for receiving coffee powder therein and extracting coffee essence from said coffee powder in said container, said coffee extracting apparatus further comprising:

air feeding means connected to said container for feeding pressed air into said container; and air control means connected to said air feeding means and for actuating said air feeding means after the coffee essence has been extracted from the coffee powder to remove the coffee grounds that were formed during the extraction of coffee essence.

2. A coffee extracting apparatus as claimed in claim 1, including:

water feeding means connected to said container for feeding hot water into said container with pressing said hot water; and water control means connected to water feeding means for controlling an actuation of said water feeding means.

3. A coffee extracting apparatus for extracting coffee essence from coffee powder comprising:

a cylindrical container having an outlet opening for receiving coffee powder therein, coffee essence being extracted from said coffee powder in said cylindrical container;

a support member for supporting a filter member to cover said outlet opening of the cylindrical container;

air feeding means connected to said cylindrical container for feeding pressed air into said cylindrical container; and air control means connected to said air feeding means for actuating said air feeding means after said coffee essence is discharged from said cylindrical container through said filter member.

4. A coffee extracting apparatus comprising a container for receiving coffee powder therein and extracting coffee essence from said coffee powder in said container, said container having an outlet opening for discharging said coffee essence therethrough, said coffee extracting apparatus further comprising:

air feeding means connected to said container for feeding pressed air into said container;

air control means connected to said air feeding means and for actuating said air feeding means after the coffee essence has been extracted from the coffee powder to remove the coffee grounds that were formed during the extraction of coffee essence; and a support member connected to said container for supporting a filter member to cover said outlet opening of the container.

5. A method of extracting coffee essence from coffee powder by means of percolation, comprising the steps of:

supplying coffee powder into a cylindrical container;

feeding hot water to said coffee powder in said cylindrical container to produce liquid coffee extract and coffee grounds;

discharging said liquid coffee extract from said cylindrical container; and feeding pressed air into said cylindrical container after the discharging step to expel said coffee grounds from said cylindrical container.

* * * * *